Sept. 8, 1936.  J. LEGENDRE  2,053,617
GROUND WORKING IMPLEMENT
Filed May 6, 1935   2 Sheets-Sheet 1
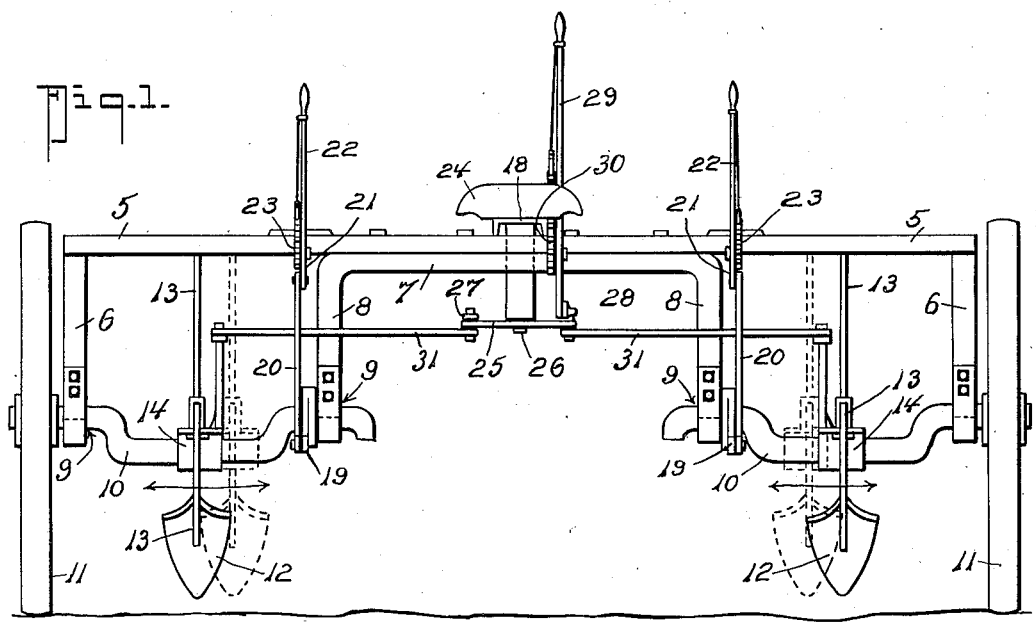
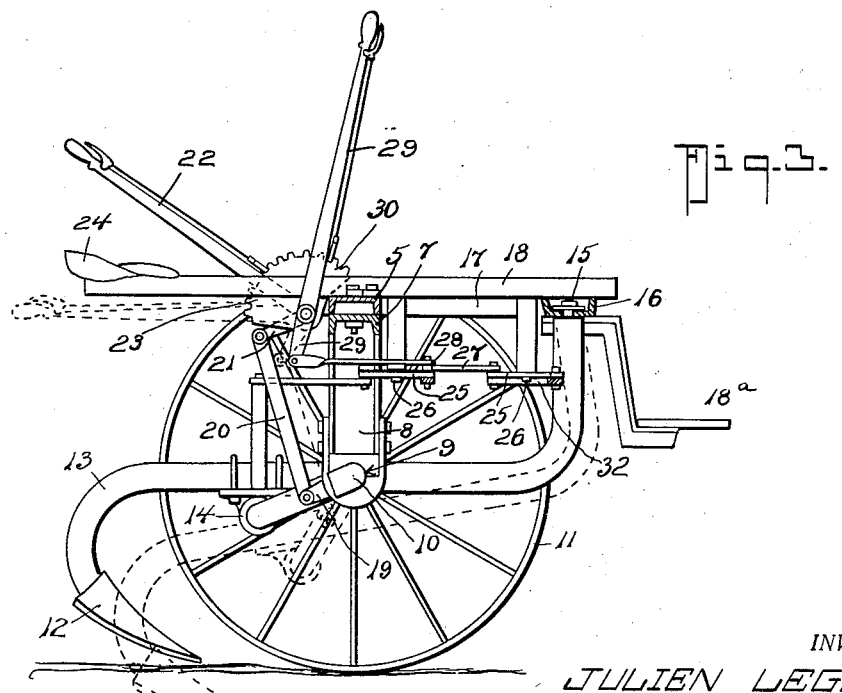
INVENTOR.
JULIEN LEGENDRE
BY
ATTORNEY Sept. 8, 1936. J. LEGENDRE 2,053,617
GROUND WORKING IMPLEMENT
Filed May 6, 1935 2 Sheets-Sheet 2
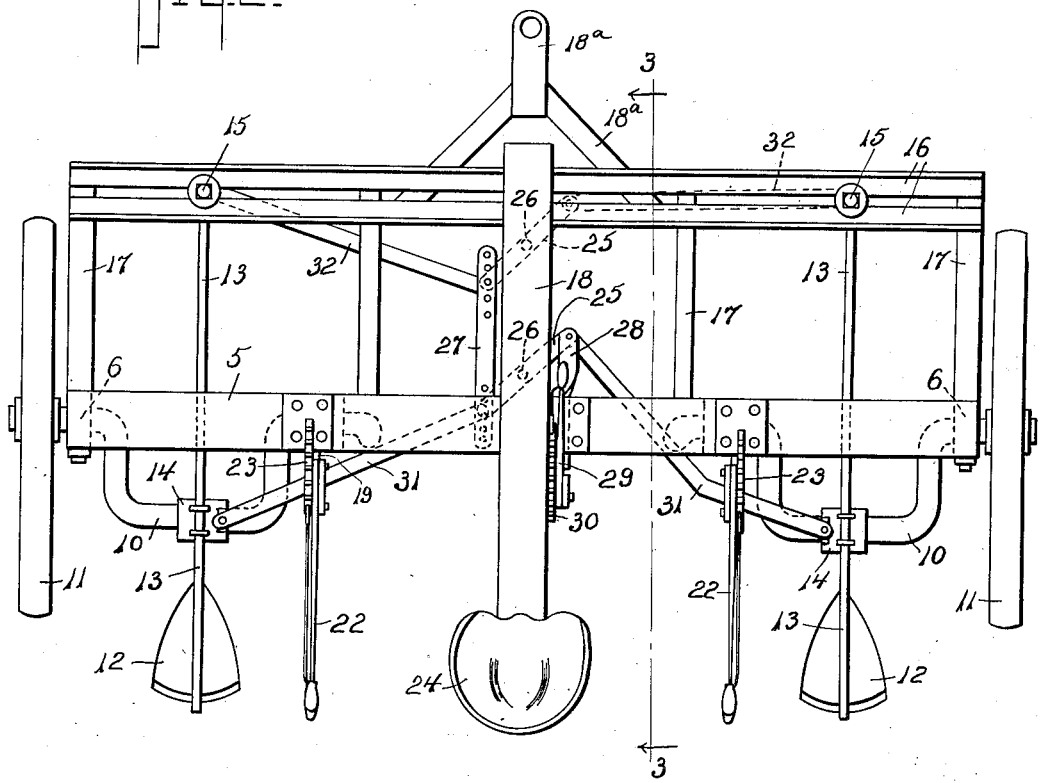
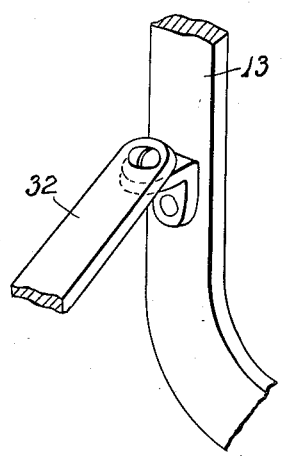
INVENTOR.
JULIEN LEGENDRE
BY
ATTORNEY Patented Sept. 8, 1936

2,053,617

UNITED STATES PATENT OFFICE 2,053,617

GROUND-WORKING IMPLEMENT

Julien Legendre, Thibodaux, La.

Application May 6, 1935, Serial No. 20,070

9 Claims. (Cl. 97—165)

The invention relates generally to farming equipment and primarily seeks to provide a novel ground working implement including a mobile frame, a pair of spaced ground-working units, and novel means for supporting and controlling the position of the units upon the frame whereby the operator of the implement may adjust the elevation of the units above the ground individually, and the lateral spacing thereof collectively, without leaving his seat.

An object of the invention is to provide in a ground-working implement a frame, including a rockable crank shaft, a ground-working unit laterally-slidably supported on the shaft, means to rock the shaft to vary the elevation of the unit above the ground, and means to slide the unit laterally along the shaft to vary its position relative to the line of draft.

Another object of the invention is to provide in a ground-working implement a frame including a pair of rockable crank shafts, a ground-working unit laterally-slidably supported on each shaft, means to individually rock the shafts to vary the elevation of the units above the ground, and means to slide the units toward and from each other along their respective shaft mountings to vary the spacing thereof.

Other objects will in part be obvious and in part be pointed out hereinafter.

To the attainment of the aforesaid objects and ends the invention further resides in the novel details of construction, combination and arrangement of parts, all of which will be first fully described in the following detailed description, then be particularly pointed out in the appended claims, reference being had to the accompanying drawings, in which:—

Figure 1 is a rear elevation, lateral adjustment of the ground-working units being indicated in dotted lines.

Figure 2 is a plan view.

Figure 3 is a vertical cross section taken on the line 3—3 of Figure 2, adjustment of the elevation of one unit being indicated in dotted lines.

Figure 4 is a detail perspective view, illustrating a link connection with the front end of one of the plow supporting arms.

In the drawings, in which like numerals of reference indicate like parts in all of the figures, 5 designates a main transverse frame bar from which end standards 6 vertically depend. An inverted U-shaped frame member 7 is secured centrally beneath the bar 5 and the ends of this member depend vertically in parallel spaced relation to the standards 6 to provide intermediate frame standards 8.

The standards of each adjacent pair 6, 8 provide bearings at their lower ends, as at 9, for a crank shaft 10. In this manner a crank shaft 10 is mounted for rocking movement about its axis at each side of the center or draft line of the implement. Each shaft 10 is laterally extended to accommodate the mounting of a supporting wheel 11.

A plow 12 is adjustably supported on each shaft 10. I have illustrated a plow in this particular disclosure, but it is to be understood that the invention comprehends the use of any similar ground-working unit, such as a disc or harrow. The supporting arm 13 of each plow or other ground-working unit is secured to a sleeve 14 which is laterally-slidably supported on the respective shaft 10, and is extended forwardly where it is laterally-slidably supported as at 15 in a guide or trackway 16 supported at 17 in advance of the frame bar 5.

A centrally disposed and forwardly projecting frame beam 18 is secured upon the frame bar 5 and the trackway 16 supported in advance thereof. A draft connection 18a likewise is secured centrally of the frame and serves as a means of attachment for any suitable draft appliance.

A crank member 19 is secured to each shaft 10, the crank portion of which is link-connected at 20 to the crank 21 of a pivoted lever and pawl equipment 22 through which adjustments of the position of the crank shafts 10 may be effected, suitable rack segments 23 serving to cooperate with the equipments 22 in securing the adjustments made.

An operator's seat 24 is secured upon the rear end of the center beam 18 and it will be noted that the lever and pawl equipments by which individual adjustments of the positions of the crank shafts 10 may be effected are so arranged as to be readily accessible to the operator while sitting in the seat 24.

Two crank arms 25 are pivotally supported at 26 intermediately of their ends upon the center beam 18 and are connected to rock in unison by a link member 27. One of the arms 25 is connected by a link 28 with a lever and pawl equipment 29 mounted for cooperation with the rack segment 30. By this means rocking movement may be imparted for collectively adjusting the positions of the arms 25, the adjustments being secured by the rack and pawl devices. It will be noted also that the adjusting lever is positioned just in advance of the operator's seat 24.

The rearmost rocker or crank arm 25 has its ends link-connected, as at 31, to the respective slide sleeves 14 of the ground-working units, and the foremost arm 25 has its ends similarly connected, as at 32, to the front ends of the unit arms 13. It will be obvious that as the arms are rocked about their pivots the link connections 31, 32 will cause the ground-working arms 13 to move simultaneously toward or from each other, thus varying the spaced relation of the units, or, in other words, the distance of each unit to one side of the line of draft.

In the foregoing description I have disclosed a novel ground-working implement embodying two ground-working units, and means for lifting or lowering the units individually and for simultaneously moving the units toward or from each other to vary the spaced relation thereof. These adjustments may be effected by the operator, conveniently, without leaving his seat. The implement is so constructed, and its parts so arranged and capable of adjustment, that it can actually work on one row, two rows or between three rows.

From the foregoing description, taken in connection with the accompanying drawings, it is thought that the construction, operation and advantages of my invention will be clear to those skilled in the art to which it appertains.

What I claim is:

1. In an implement of the character described, a mobile frame, a pair of crank shafts supported in said frame for movement about their axes, a ground-working unit laterally-slidably supported on each shaft and on said frame, means to individually adjust said shafts about their axes for raising or lowering said units, and means for simultaneously slidably-adjusting said units toward or from each other on said shafts and on said frame to vary the spacing thereof.

2. In an implement of the character described, a frame, a pair of crank shafts supported in said frame for movement about their axes, a ground-working unit laterally-slidably supported on each shaft and on said frame, supporting wheels mounted on said shafts, means to individually adjust said shafts about their axes for raising or lowering said units, and means for simultaneously slidably-adjusting said units toward or from each other on said shafts and on said frame to vary the spacing thereof.

3. An implement of the character described, comprising a mobile frame including a draft beam, a pair of crank shafts rockably supported in said frame one at each side of said draft beam, a ground-working unit slidable on and vertically movable with each crank shaft and slidably connected to said frame, a lever and link connection for rocking each shaft to individually raise or lower the units, and lever and link connections for simultaneously sliding said units toward or from each other to vary their spaced relation.

4. An implement of the character described, comprising a frame including a draft beam, a pair of crank shafts rockably supported in said frame one at each side of said draft beam, a ground-working unit slidable on and vertically movable with each crank shaft and slidably connected to said frame, a lever and link connection for rocking each shaft to individually raise or lower the units, lever and link connections for simultaneously sliding said units toward or from each other to vary their spaced relation, each said shaft having a lateral extension, and a supporting wheel mounted on each extension.

5. An implement of the character described, comprising a mobile frame, a pair of crank shafts rockably supported in said frame, a pair of ground-working units each including a frame arm laterally-slidably supported at its rear end on one of the crank shafts and at its front end on said frame, means for rocking the shafts individually to raise or lower the units, and means to slide-adjust said frame arms simultaneously at the front and rear ends thereof.

6. An implement of the character described, comprising a mobile frame, a pair of crank shafts rockably supported in said frame, a pair of ground-working units each including a frame arm laterally-slidably supported at its rear end on one of the crank shafts and at its front end on said frame, lever and link connections for rocking each shaft to individually raise or lower the units, and lever and link connections for simultaneously sliding the frame arms bodily toward or from each other to vary the spacing of the units.

7. An implement of the character described, comprising a frame including a draft beam, a pair of crank shafts rockably supported in said frame one at each side of said draft beam, a pair of ground-working units each including a frame arm laterally-slidably supported at its rear end on one of the crank shafts and at its front end on said frame, lever and link connections for rocking each shaft to individually raise or lower the units, lever and link connections supported in part on said draft beam for simultaneously sliding the frame arms bodily toward or from each other to vary the spacing of the units, each said crank shaft having a lateral extension, and a supporting wheel mounted on each extension.

8. In an implement of the character described, an elevated frame including a main transverse frame bar, a front transverse slotted trackway, longitudinal supports connecting said trackway with and supporting it by said main transverse beam, a central longitudinally disposed beam connecting said trackway with said main transverse frame bar, a pair of spaced apart end and intermediate standards depending from said main transverse frame bar at each side of the frame and having shaft bearings adjacent their lower ends, a crank shaft supported in the bearings of each pair of standards, said intermediate standards being spaced apart to clear a row of plants, a ground working implement supporting arm pivotally and laterally slidably mounted on each crank shaft and extending forwardly and upwardly to said trackway, means to connect said arm to said trackway to be laterally slidable along the same, a front lever arm and a back lever arm mounted between the positions of said working implement supporting arms, a link connecting said front lever arm to said back lever arm, links connecting said front lever arm with the front ends of the respective implement supporting arms, links connecting said back lever arm with the implement supporting arms adjacent the places where they are mounted on said crank shafts, a hand operated lever operatively connected with one of said lever arms in virtue of which the operator may simultaneously move said implement supporting arms bodily laterally toward and from one another while maintaining them in spaced parallelism, and ground wheels mounted at the sides of the frame on said crank shafts.

9. In an implement of the character described, an elevated frame including a main transverse frame bar, a front transverse slotted trackway, longitudinal supports connecting said trackway with and supporting it by said main transverse beam, a central longitudinally disposed beam connecting said trackway with said main transverse frame bar, a pair of spaced apart end and intermediate standards depending from said main transverse frame bar at each side of the frame and having shaft bearings adjacent their lower ends, a crank shaft supported in the bearings of each pair of standards, said intermediate standards being spaced apart to clear a row of plants, a ground working implement supporting arm pivotally and laterally slidably mounted on each crank shaft and extending forwardly and upwardly to said trackway, means to connect said arm to said trackway to be laterally slidable along the same, a front lever arm and a back lever arm mounted between the positions of said working implement supporting arms, a link connecting said front lever arm to said back lever arm, links connecting said front lever arm with the front ends of the respective implement supporting arms, links connecting said back lever arm with the implement supporting arms adjacent the places where they are mounted on said crank shafts, a hand operated lever operatively connected with one of said lever arms in virtue of which the operator may simultaneously move said implement supporting arms bodily laterally toward and from one another while maintaining them in spaced parallelism, ground wheels mounted at the sides of the frame on said crank shafts, and operator-actuated means to individually rock said crank shafts for raising and lowering the working implements.

JULIEN LEGENDRE.